US011199136B2

(12) United States Patent
Butcher et al.

(10) Patent No.: US 11,199,136 B2
(45) Date of Patent: Dec. 14, 2021

(54) ADDITIVELY MANUFACTURED THERMALLY INSULATING STRUCTURE

(71) Applicant: United Technologies Corporation, Farmington, CT (US)

(72) Inventors: Evan Butcher, Manchester, CT (US); Jesse R. Boyer, Middletown, CT (US); Om P. Sharma, South Windsor, CT (US); Lawrence Binek, Glastonbury, CT (US); Bryan G. Dods, Greer, SC (US); Vijay Narayan Jagdale, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 222 days.

(21) Appl. No.: 16/152,848

(22) Filed: Oct. 5, 2018

(65) Prior Publication Data

US 2020/0109668 A1   Apr. 9, 2020

(51) Int. Cl.
| | |
|---|---|
| *F02C 7/25* | (2006.01) |
| *B33Y 80/00* | (2015.01) |
| *B33Y 10/00* | (2015.01) |
| *F02C 7/04* | (2006.01) |
| *B22F 10/20* | (2021.01) |

(52) U.S. Cl.
CPC ............... *F02C 7/25* (2013.01); *B33Y 10/00* (2014.12); *B33Y 80/00* (2014.12); *F02C 7/04* (2013.01); *B22F 10/20* (2021.01); *F05D 2220/32* (2013.01); *F05D 2230/31* (2013.01); *F05D 2300/502* (2013.01)

(58) Field of Classification Search
CPC .. F02C 7/24; F02C 7/25; F01D 25/145; F05D 2250/80; F05D 2250/82; F05D 2260/231
See application file for complete search history.

(56) References Cited

U.S. PATENT DOCUMENTS

| | | | |
|---|---|---|---|
| 2013/0233526 A1* | 9/2013 | Hislop | F28D 1/06 165/168 |
| 2014/0314613 A1 | 10/2014 | Hopkinson et al. | |
| 2016/0290164 A1 | 10/2016 | Liebl et al. | |
| 2017/0159565 A1* | 6/2017 | Evulet | F02K 1/002 |
| 2018/0001423 A1 | 1/2018 | Stevenson et al. | |

FOREIGN PATENT DOCUMENTS

| | | |
|---|---|---|
| CN | 107327045 A | 11/2017 |
| CN | 207673439 U | 7/2018 |
| DE | 102007015389 A1 | 10/2007 |
| EP | 3284996 A1 | 2/2018 |
| FR | 3040733 A1 | 3/2017 |
| WO | 2017212211 A1 | 12/2017 |
| WO | 2018102075 A2 | 6/2018 |

OTHER PUBLICATIONS

European Search Report dated Feb. 27, 2020 issued for corresponding European Patent Application No. 19201790.3.

* cited by examiner

*Primary Examiner* — Scott J Walthour
(74) *Attorney, Agent, or Firm* — Bachman & LaPointe, P.C.

(57) ABSTRACT

An additively manufactured thermally insulating structure comprising a base layer and a fire-resistant layer adjacent to the base layer that forms an air gap therebetween. A method for assembling a miniature gas turbine engine includes additively manufacturing an additively manufactured thermally insulating structure onto a static structure of the miniature gas turbine engine.

17 Claims, 8 Drawing Sheets

ADDITIVELY MANUFACTURED THERMALLY INSULATING STRUCTURE

BACKGROUND

The present disclosure relates to additive manufacturing and, more particularly, to an additively manufactured thermally insulating structure for a miniature gas turbine or turbojet engines.

Miniature gas turbine or turbojet engines that are typically 1000 pound-force (lbf) thrust and smaller, are often utilized in attritable or expendable applications such as reconnaissance drones, cruise missiles, decoys, and other applications, including air-launched and ground-launched weapon systems. The use of such single use gas turbine engines greatly extends the range of the air vehicle in comparison to the more conventional solid fuel rocket engine; however, such engines need to be manufactured relatively inexpensively yet provide a high degree of reliability and efficiency.

The miniature gas turbine is thermally shielded from the vehicle during operation to provide thermal isolation and/or for fire-retardant purposes. A thermal blanket is wrapped around engine components to provide the shielding after assembly of the engine and retained thereto with band clamps. The thermal blanket is typically specialized and requires labor-intensive construction of a combination of fabric, composite, and metallic material layers, which form a compliant structure. Although effective, such blankets are relatively expensive and time consuming to fabricate and install.

SUMMARY

An additively manufactured thermally insulating structure according to one disclosed non-limiting embodiment of the present disclosure includes a base layer; and a fire-resistant layer adjacent to the base layer that forms an air gap therebetween.

A further embodiment of any of the foregoing embodiments of the present disclosure includes that the base layer forms a static structure of a gas turbine engine.

A further embodiment of any of the foregoing embodiments of the present disclosure includes that the base layer is 0.1-0.2 inches (about 2.5-5 mm) thick and the fire-resistant layer is 0.1-0.2 inches (about 2.5-5 mm) thick.

A further embodiment of any of the foregoing embodiments of the present disclosure includes that the air gap is 0.25-0.5-inch thick (about 6-13 mm).

A further embodiment of any of the foregoing embodiments of the present disclosure includes a lattice structure within the air gap.

A further embodiment of any of the foregoing embodiments of the present disclosure includes a duct through the air gap.

A further embodiment of any of the foregoing embodiments of the present disclosure includes that the duct comprises at least one intake and at least one exhaust.

A miniature gas turbine engine according to one disclosed non-limiting embodiment of the present disclosure includes a static structure; and an additively manufactured fire-resistant layer additively manufactured to the static structure to form an air gap therebetween.

A further embodiment of any of the foregoing embodiments of the present disclosure includes that the static structure comprises at least one of a forward housing, a combustor housing, and an exhaust pipe.

A further embodiment of any of the foregoing embodiments of the present disclosure includes that the fire-resistant layer adjacent forms a pattern which facilitates fire resistance.

A further embodiment of any of the foregoing embodiments of the present disclosure includes that the fire-resistant layer comprises at least one intake and at least one exhaust.

A further embodiment of any of the foregoing embodiments of the present disclosure includes that the fire-resistant layer comprises an airflow path.

A further embodiment of any of the foregoing embodiments of the present disclosure includes that the fire-resistant layer comprises an air gap with a lattice structure.

A method for assembling a gas turbine engine according to one disclosed non-limiting embodiment of the present disclosure includes additively manufacturing a base layer; and additively manufacturing a fire-resistant layer adjacent to the base layer to form an air gap therebetween.

A further embodiment of any of the foregoing embodiments of the present disclosure includes that additively manufacturing the base layer comprises additively manufacturing a static structure of the gas turbine engine.

A further embodiment of any of the foregoing embodiments of the present disclosure includes that additively manufacturing the base layer comprises additively manufacturing at least one of a forward housing, a combustor housing, and an exhaust pipe.

A further embodiment of any of the foregoing embodiments of the present disclosure includes that additively manufacturing the fire-resistant layer adjacent to the base layer forms an additively manufactured thermally insulating structure.

A further embodiment of any of the foregoing embodiments of the present disclosure includes assembling the additively manufactured thermally insulating structure onto a static structure of a gas turbine engine.

A further embodiment of any of the foregoing embodiments of the present disclosure includes additively manufacturing a duct into the air gap.

A further embodiment of any of the foregoing embodiments of the present disclosure includes additively manufacturing a lattice structure into the air gap.

A further embodiment of any of the foregoing embodiments of the present disclosure includes that the additively manufacturing a fire-resistant layer forms a pattern on an outer surface.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
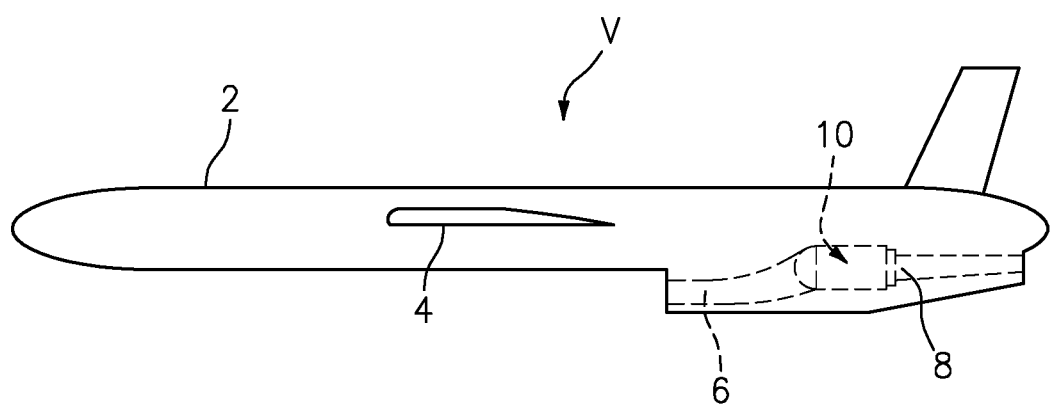
FIG. 1 is a general perspective view an exemplary vehicle embodiment for use with a miniature gas turbine engine.

FIG. 1 illustrates a general schematic view of an air vehicle V including a miniature gas turbine engine 10. The air vehicle V may include a body 2 and one or more aerodynamic surfaces 4. The miniature gas turbine engine 10 is coupled to, or contained within, the body 2. An intake 6 of the air vehicle V provides air to the miniature gas turbine engine 10 and an exhaust 8 directs the thrust therefrom.

Figure 2:
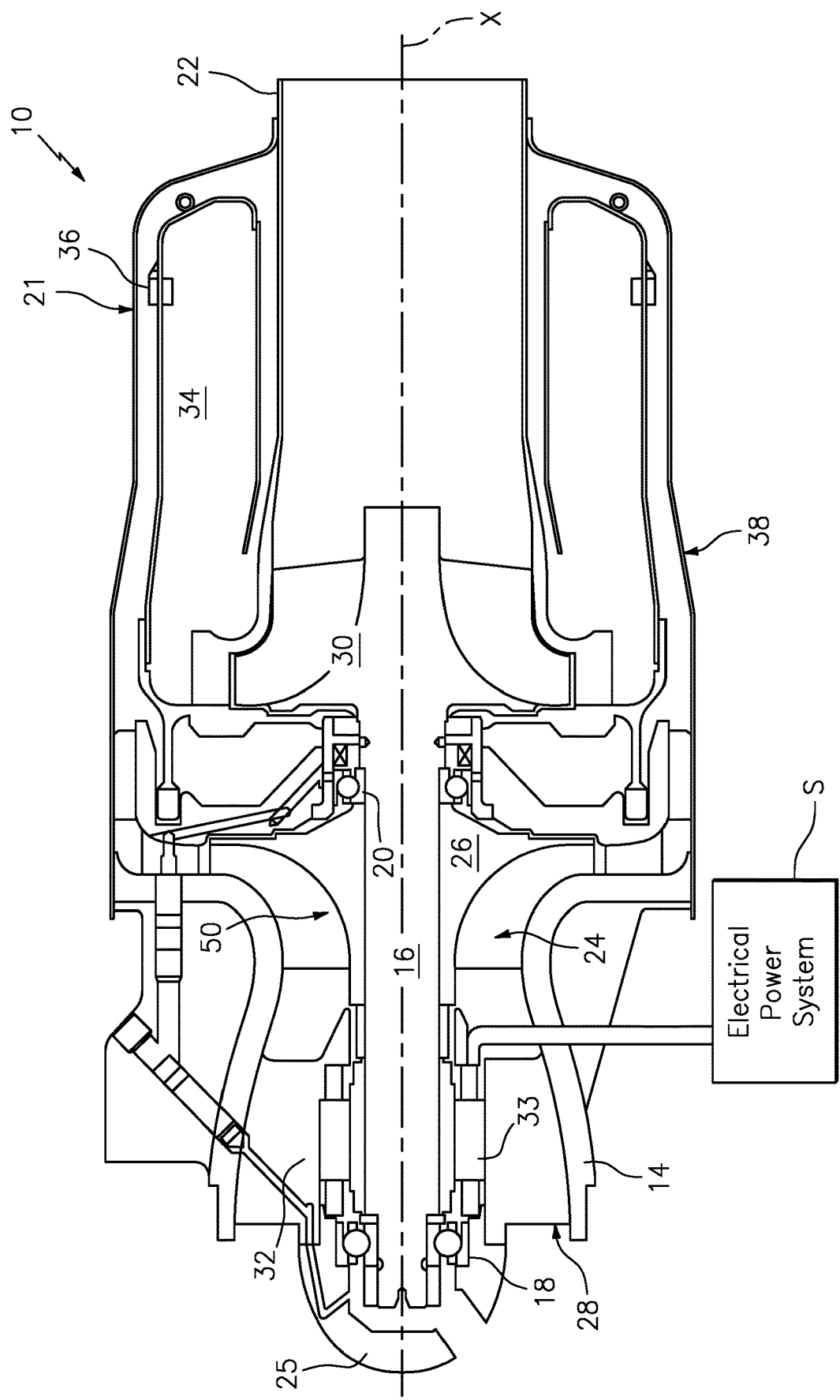
FIG. 2 is a schematic view of an exemplary miniature gas turbine engine according to one disclosed non-limiting embodiment.

With reference to FIG. 2, the miniature gas turbine engine 10 generally includes a housing 14, a rotor shaft 16 rotationally mounted to a forward bearing 18 and an aft bearing 20, a combustion system 21, and an exhaust pipe 22. The rotor shaft 16 rotates about a longitudinal axis X. In the illustrated rotor configuration, a rotor 24 includes compressor blades 26 facing forward toward an inlet 28 and turbine blades 30 facing rearward toward the exhaust pipe 22 to define a turbine wheel on the rotor shaft 16. The rotor shaft 16 is received in the bearings 18, 20, and is coupled to a fuel pump 32 to provide fuel to an annular combustor liner 34 through a fuel manifold 36. A permanent magnet generator 33 is mounted to the rotor shaft 16 to generate electrical power for the engine 10 and other accessories.

Figure 3:
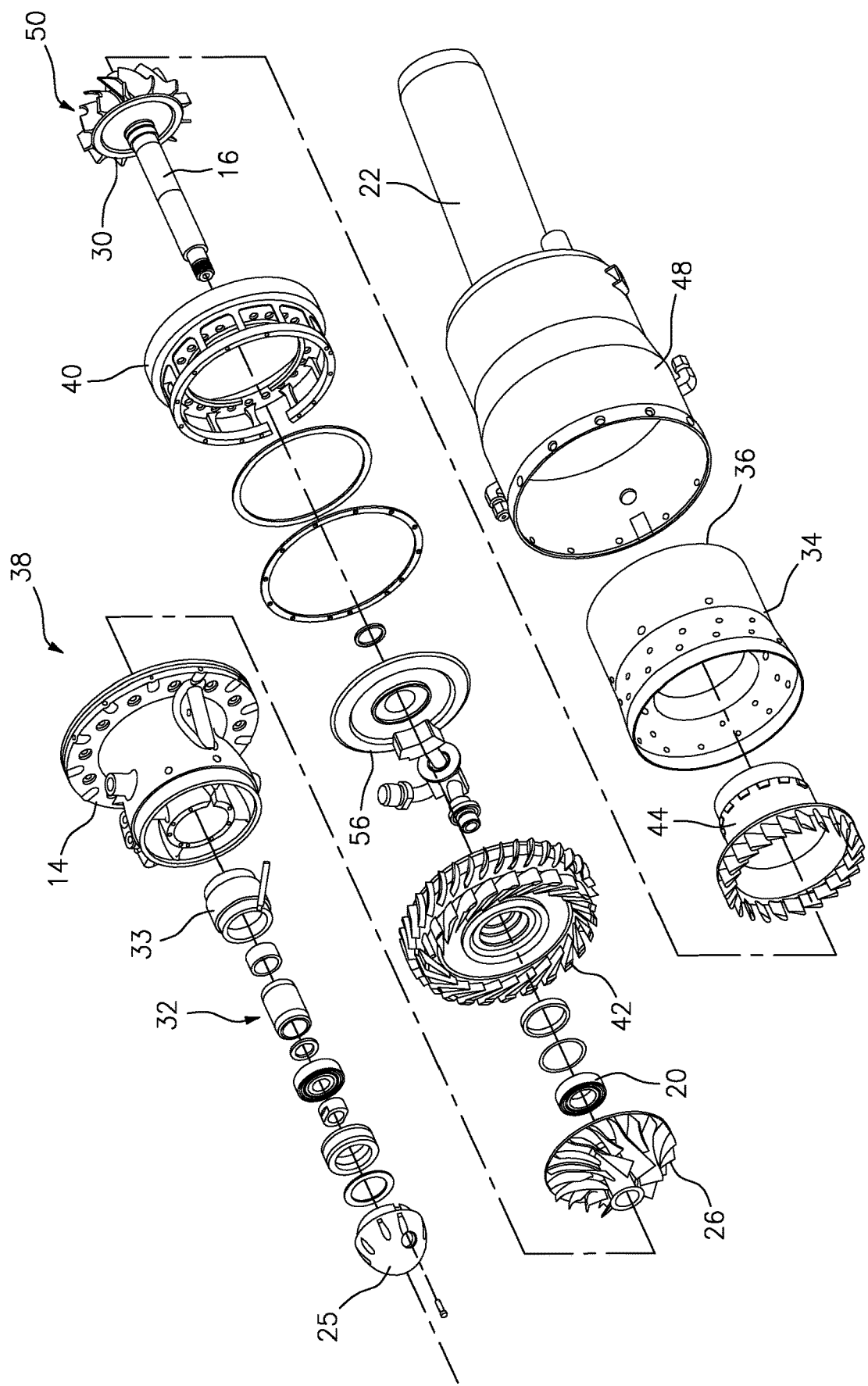
FIG. 3 is an exploded view of the miniature gas turbine engine.

With reference also to FIG. 3, a static structure 38 of the engine 10 generally includes the forward housing 14, the forward cover 25, a nozzle plate 40, a diffuser 42, a turbine nozzle 44, a combustor liner 34, a combustor housing 48 and the exhaust pipe 22 (FIG. 3). The forward cover 25 and the diffuser 42 support a rotational system 50 that includes the rotor shaft 16 and rotational components mounted for rotation therewith. The forward cover 25 supports the forward bearing 18 and the diffuser 42 supports the aft bearing 20. The static structure 38 is typically manufactured of a metal alloy and may be assembled together by one or more relatively low-cost fastening techniques such as threaded fasteners, welding, v-band clamps, rivets, or the like.

Figure 4:
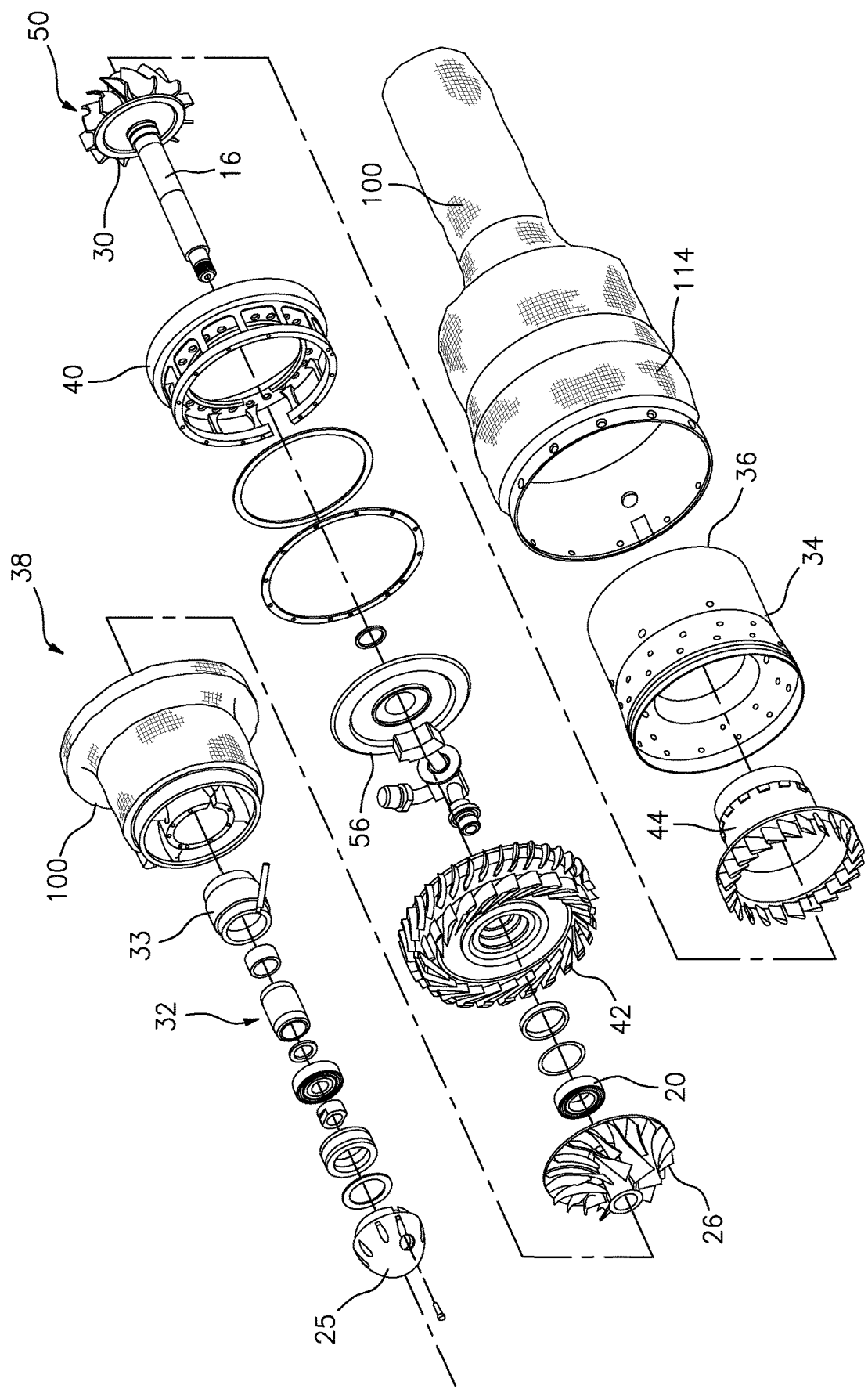
FIG. 4 is an exploded view of the miniature gas turbine engine.

With reference to FIG. 4, an additively manufactured thermally insulating structure 100 at least partially surrounds, or forms a portion of, the static structure 38. The additively manufactured thermally insulating structure 100 may be additively manufactured integral with the static structure 38 or alternatively separately for later application to the engine 10 in a manner similar to application of a conventional blanket. That is, the additively manufactured thermally insulating structure 100 may be directly additively manufactured into the engine 10. Although the additively manufactured thermally insulating structure 100 is used for the miniature gas turbine engine 10 in the disclosed embodiment, various other applications may benefit from the additively manufactured thermally insulating structure 100.

Figure 5:
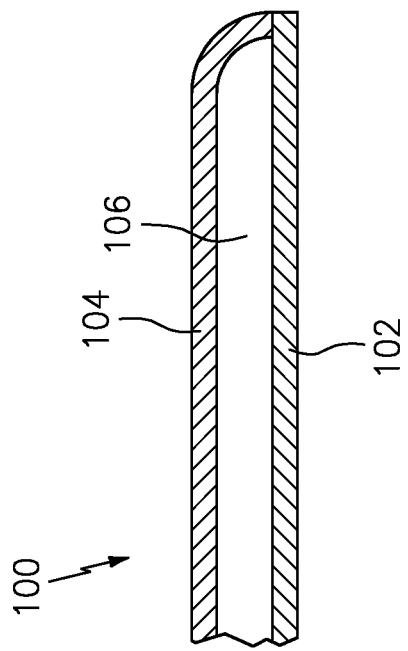
FIG. 5 is an expanded view of an additively manufactured thermally insulating structure for a miniature gas turbine engine.

With reference to FIG. 5, the additively manufactured thermally insulating structure 100 according to one embodiment includes a base layer 102 and a fire-resistant layer 104 that forms an air gap 106 therebetween. The base layer 102 forms the static structure 38 of the engine 10 and the fire-resistant layer 104 is spaced therefrom. That is, the base layer 102 may be that which forms the static structure 38 such that the fire-resistant layer 104 that forms the air gap 106 therebetween is integrated therewith. Alloys such as 625 Alloy, 718 Alloy, 230 Alloy, stainless steel, tool steel, cobalt chrome, titanium, nickel, aluminum and others may have specific benefit for environments typically encountered by aerospace and gas turbine engine components such as the base layer 102 and the fire-resistant layer 104. In one example, the base layer 102 is about 0.1-0.2 inches (about 2.5-5 mm) thick, the fire-resistant layer 104 are about 0.1-0.2 inches (about 2.5-5 mm) thick with an about 0.25-0.5-inch thick (about 6-13 mm) air gap 106. The base layer 102 and the fire-resistant layer 104 may be additively manufactured of the same or dissimilar material. The fire-resistant layer 104 may be additively manufacturing to forms a pattern 114, e.g., a waffle pattern, on an outer surface thereof to facilitate the fire resistance.

Figure 6:
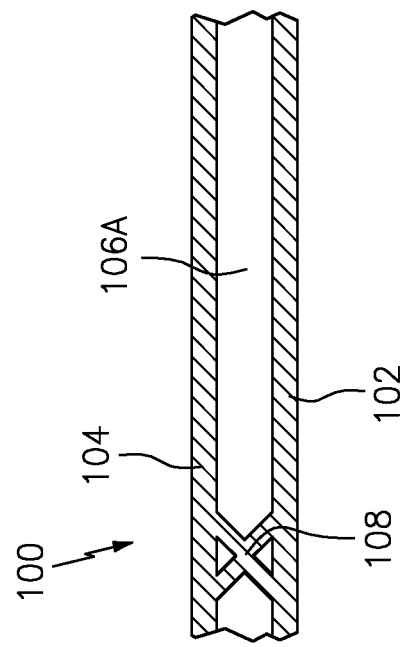
FIG. 6 is a sectional view of the additively manufactured thermally insulating structure according to one disclosed non-limiting embodiment.

With reference to FIG. 6, in another disclosed non-limiting embodiment, the air gap 106 includes a lattice structure 108. In examples, the lattice structure 108 forms numerous contiguous "X" shapes, while other examples may utilize other matrix shapes such as triangular shapes. These various matrix shapes provide support between the base layer 102 and the fire-resistant layer 104 yet maintains the air gap 106A. Alternatively, the air gap 106b could be an monolithic material that has a low thermal conductivity to provide insulating characteristics.

Figure 7:
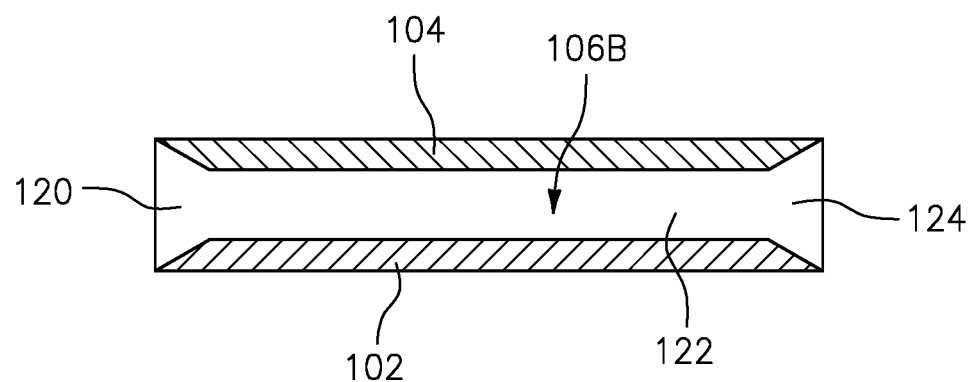
FIG. 7 is a sectional view of the additively manufactured thermally insulating structure according to another disclosed non-limiting embodiment.
Figure 9:
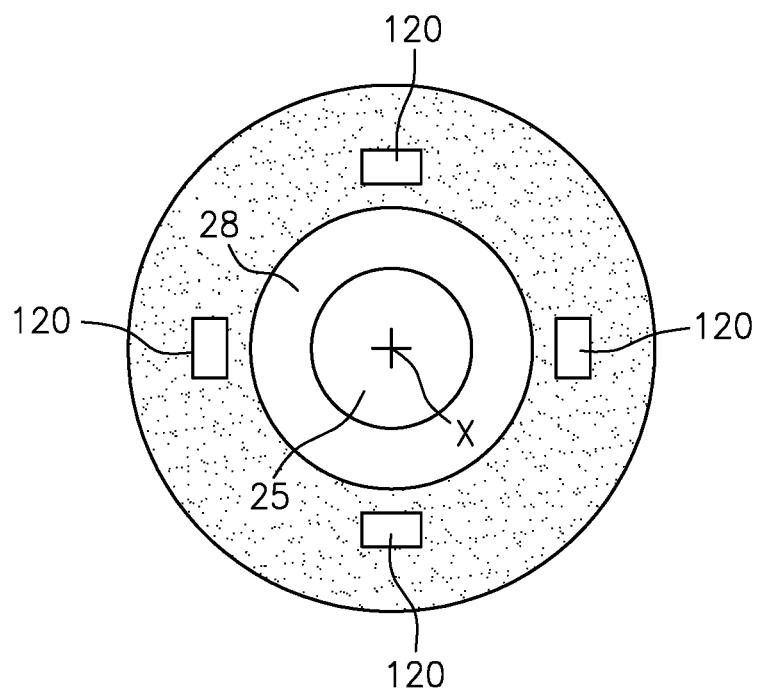
FIG. 9 is a front view of the additively manufactured thermally insulating structure with a multiple of intakes to the active cooling flow of FIG. 8.
Figure 8:
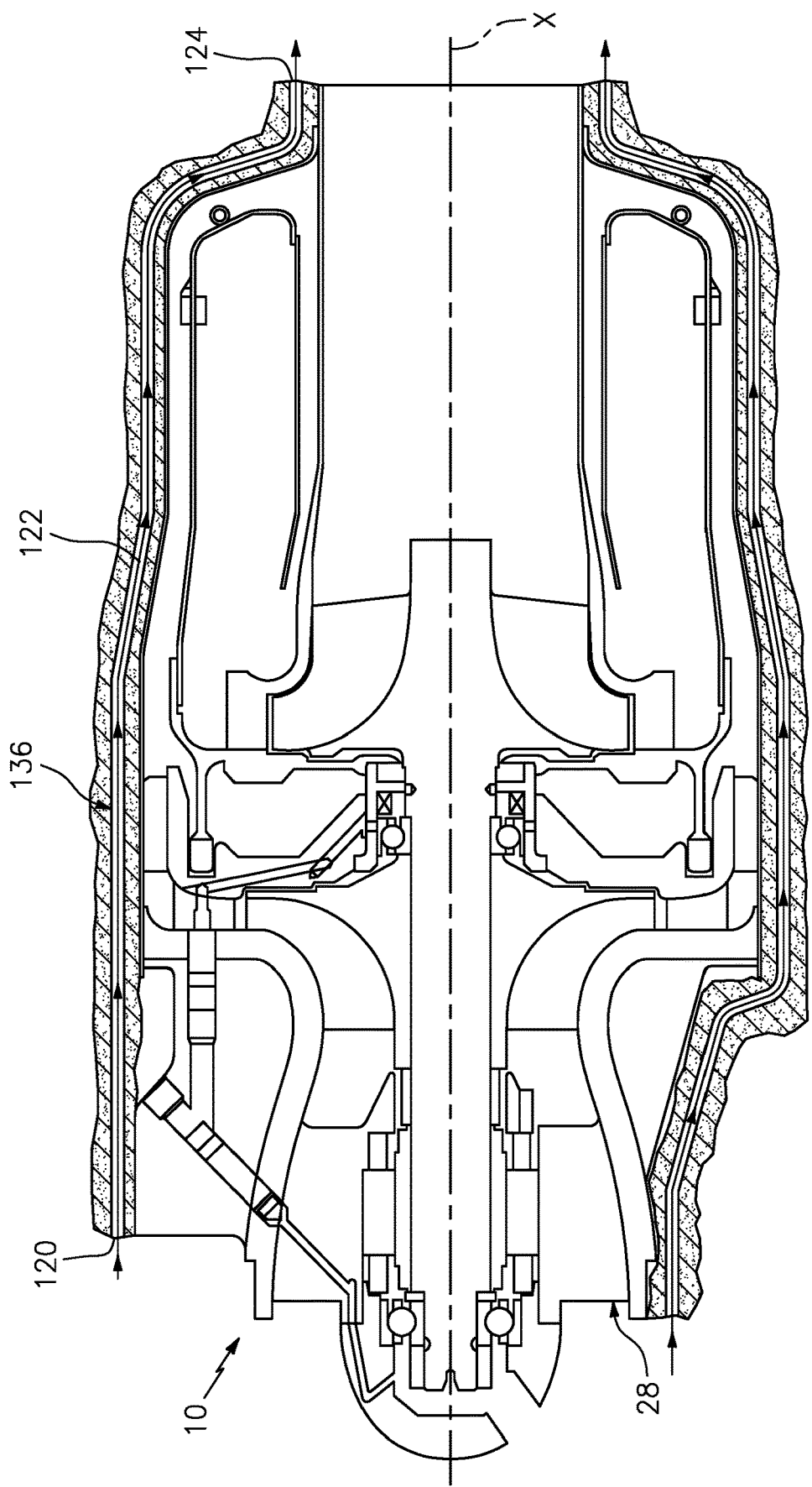
FIG. 8 is a longitudinal sectional view of the additively manufactured thermally insulating structure with an active cooling flow path according to another disclosed non-limiting embodiment.

With reference to FIG. 7, in another disclosed non-limiting embodiment, the air gap 106B forms an intake 120, a duct 122, and an exhaust 124 to form a bypass duct 136 such that an airflow is passed through the additively manufactured thermally insulating structure 100 to provide active cooling via airflow (FIG. 8). The bypass duct 136 may be discrete linear ducts, an integral duct with multiple intakes 120 (FIG. 9) and exhausts 124, or other combinations either with, or without, the lattice structure 108 (FIG. 7).

Figure 10:
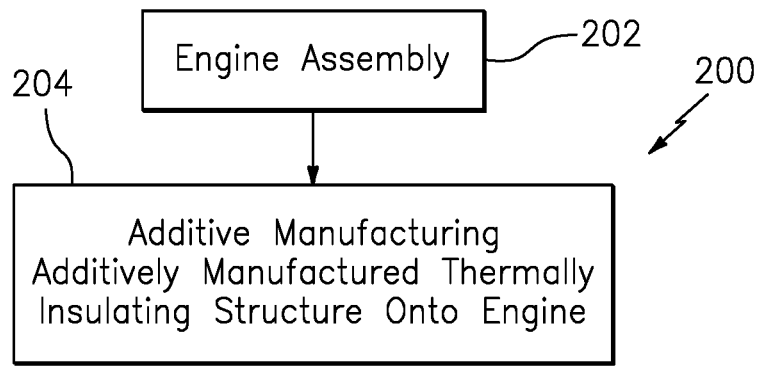
FIG. 10 is a flow chart illustrating a method to install the additively manufactured thermally insulating structure onto a miniature gas turbine engine according to one disclosed non-limiting embodiment.

With reference to FIG. 10, a method 200 to install the additively manufactured thermally insulating structure 100 initially includes assembly of the engine 10 (202). Next, the additively manufactured thermally insulating structure 100 is additively manufactured onto the static structure 38 once the engine 10 is assembled (204). The additive manufacturing process includes, but is not limited to, Fused deposition modeling (FDM), Stereolithography (SLA), processes using a layer-by-layer UV curing, Selective Laser Sintering (SLS), Electron Beam Sintering (EBS), Electron Beam Melting (EBM), Electron Beam Powder Bed Fusion (EB-PBF), Electron Beam Powder Wire (EBW), Laser Engineered Net Shaping (LENS), Laser Net Shape Manufacturing (LNSM), Direct Metal Deposition (DMD), and Laser Powder Bed Fusion (L-PBF). The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum, acrylonitrile butadiene styrene (ABS), nylon, polylactic acid (PLA), polyurethane, urethane, silicone, epoxy, photopolymers that provide rubber-like flexibility, and others in atomized powder material form. That is, the engine 10 may be loaded into the additive manufacturing system and the additively manufactured thermally insulating structure 100 is additively manufactured thereon.

Figure 11:
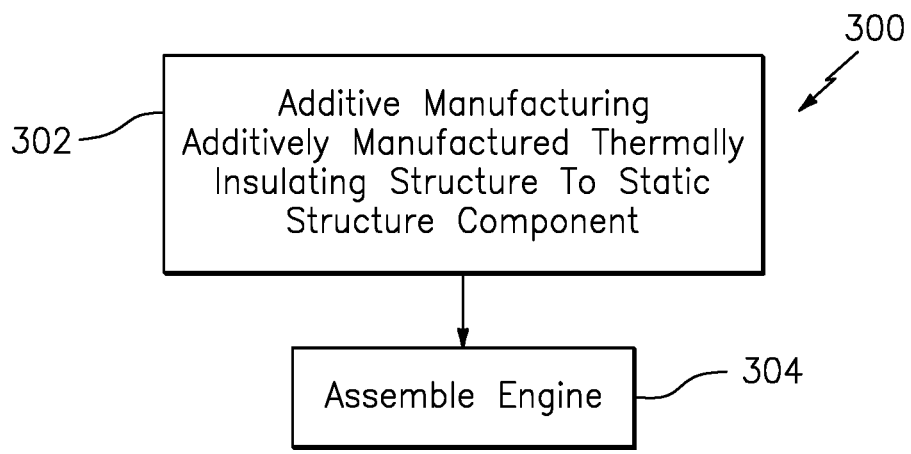
FIG. 11 is a flow chart illustrating a method to install the additively manufactured thermally insulating structure onto a miniature gas turbine engine according to one disclosed non-limiting embodiment.

With reference to FIG. 11, a method 300 to install the additively manufactured thermally insulating structure 100 according to another disclosed non-limiting embodiment initially includes additively manufacturing the additively manufactured thermally insulating structure 100 onto the static structure 38 (302). For example, the forward housing 14, the combustor housing 48 and the exhaust pipe 22 are individually loaded into the additive manufacturing system and the additively manufactured thermally insulating structure 100 is additively manufactured thereon. Next, the engine 10 is assembled (304) from the components that have the additively manufactured thermally insulating structure 100 additively manufactured thereon. The additively manufactured thermally insulating structure is thus integrated onto each component individually to facilitate assembly and disassembly.

Figure 12:
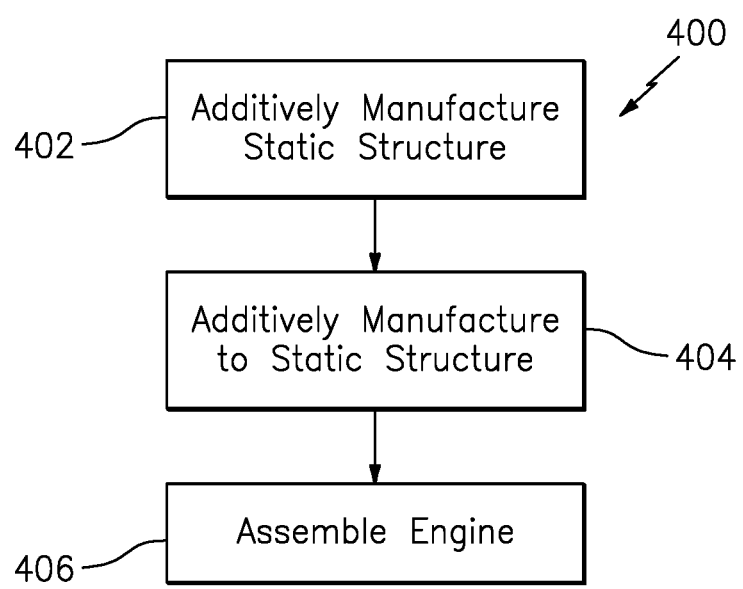
FIG. 12 is a flow chart illustrating a method to incorporate the additively manufactured thermally insulating structure into a miniature gas turbine engine according to one disclosed non-limiting embodiment.

With reference to FIG. 12, a method 400 to install the additively manufactured thermally insulating structure 100 according to another disclosed non-limiting embodiment initially includes additively manufacturing the static structure 38 (402) as the base layer 102. For example, the forward housing 14, the combustor housing 48 and the exhaust pipe 22 are additively manufactured and forms the base layer 102. Next, the fire-resistant layer 104 is additively manufactured to the base layer 102 (404) to form the air gap 106 therebetween to form static structure 38 components that have the additively manufactured thermally insulating structure 100 integral therewith.

Next, the engine 10 is assembled (406) from the components that have the additively manufactured thermally insulating structure 100 additively manufactured thereon. The additively manufactured thermally insulating structure is thus integrated onto each component individually to facilitate assembly and disassembly.

The additively manufactured thermally insulating structure increases the attritable or expendable propulsion systems by, for example, integration of complex performance-enhancing features, lowering production costs, and reducing time to delivery; that are typically prohibitive when leveraging conventional manufacturing techniques.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. An assembly for a gas turbine engine, comprising:
   a turbine wheel within a housing, the turbine wheel mounted on a rotor shaft, the rotor shaft rotationally mounted within the static structure around the longitudinal axis, the turbine wheel comprising compressor blades facing toward the forward housing and turbine blades facing toward the exhaust pipe;
   an additively manufactured base layer that at least partially forms a static structure of a gas turbine engine along a longitudinal axis; and
   a fire-resistant layer additively manufactured to the additively manufactured base layer to form an additively manufactured thermally insulating structure, the additively manufactured fire-resistant layer and the additively manufactured base layer forming an air gap therebetween, wherein the air gap forms an intake, a duct, and an exhaust to define a bypass duct that extends along a direction of the longitudinal axis such that an airflow is communicable through the additively manufactured thermally insulating structure to provide active cooling via airflow through the bypass duct along an axial length of the gas turbine engine, wherein the intake is positioned forward of the compressor blades and the bypass duct and the longitudinal axis extend within a common plane.

2. The assembly as recited in claim 1, wherein the additively manufactured base layer is 0.1-0.2 inches thick and the fire-resistant layer is 0.1-0.2 inches thick.

3. The assembly as recited in claim 1, wherein the air gap is 0.25-0.5-inch thick.

4. The assembly as recited in claim 1, further comprising a lattice structure within the air gap.

5. A gas turbine engine, comprising:
   a base layer that forms a static structure that comprises at least one of a forward housing, a combustor housing, and an exhaust pipe along a longitudinal axis;
   a turbine wheel within the combustor housing, the turbine wheel mounted on a rotor shaft, the rotor shaft rotationally mounted within the static structure about the longitudinal axis, the turbine wheel comprising compressor blades facing toward the forward housing and turbine blades facing toward the exhaust pipe; and
   an additively manufactured fire-resistant layer additively manufactured to the base layer to form an additively manufactured thermally insulating structure, the additively manufactured fire-resistant layer and the base layer forming an air gap therebetween, wherein the air gap forms an intake, a duct, and an exhaust to define a bypass duct that extends along a direction of the longitudinal axis such that an airflow is communicable through the additively manufactured thermally insulating structure to provide active cooling via airflow through the bypass duct, wherein the intake is positioned forward of the compressor blades and the bypass duct and the longitudinal axis extend within a common plane.

6. The gas turbine engine as recited in claim 5, wherein the fire-resistant layer forms a pattern which facilitates fire resistance.

7. The gas turbine engine as recited in claim 5, wherein the air gap contains a lattice structure.

8. The gas turbine engine as recited in claim 5, wherein the gas turbine engine is 1000 pound-force (lbf) thrust or smaller.

9. A gas turbine engine, comprising:
an additively manufactured base layer that at least partially forms a static structure of the gas turbine engine along a longitudinal axis, the static structure comprising components including at least one of a forward housing, a combustor housing, and an exhaust pipe;
a turbine wheel within the combustor housing, the turbine wheel mounted on a rotor shaft, the rotor shaft rotationally mounted within the static structure around the longitudinal axis, the turbine wheel comprises compressor blades facing toward the forward housing and turbine blades facing toward the exhaust pipe; and
an additively manufactured fire-resistant layer additively manufactured to the additively manufactured base layer to form an additively manufactured thermally insulating structure, the additively manufactured fire-resistant layer and the additively manufactured base layer forming an air gap therebetween, wherein the air gap forms an intake, a duct, and an exhaust to define a bypass duct that extends along a direction of the longitudinal axis such that an airflow is communicable through the additively manufactured thermally insulating structure to provide active cooling via airflow through the bypass duct, wherein the intake is positioned forward of the compressor blades and the bypass duct and the longitudinal axis extend within a common plane.

10. The gas turbine engine as recited in claim 9, wherein the gas turbine engine is 1000 pound-force (lbf) thrust and or smaller.

11. The gas turbine engine as recited in claim 10, wherein the fire-resistant layer forms a pattern which facilitates fire resistance.

12. The gas turbine engine as recited in claim 10, wherein the duct includes multiple intakes and exhausts.

13. The gas turbine engine as recited in claim 10, wherein the additively manufactured thermally insulating structure is integrated onto each component of the static structure individually to facilitate assembly and disassembly.

14. A method for assembling a gas turbine engine, comprising:
additively manufacturing a base layer that at least partially forms a static structure of the gas turbine engine along a longitudinal axis, the static structure comprising components including at least one of a forward housing, a combustor housing, and an exhaust pipe; and
additively manufacturing a fire-resistant layer onto the additively manufactured base layer to form an additively manufactured thermally insulating structure, the additively manufactured fire-resistant layer and the additively manufactured base layer forming an air gap therebetween, the air gap forming an intake, a duct, and an exhaust to define a bypass duct that extends along a direction of the longitudinal axis such that an airflow is communicable through the additively manufactured thermally insulating structure to provide active cooling via airflow through the bypass duct, the additively manufactured fire-resistant layer comprising an outer surface and a pattern on the outer surface to facilitate fire resistance,
wherein a turbine wheel is positioned within the combustor housing, the turbine wheel is mounted on a rotor shaft, the rotor shaft is rotationally mounted within the static structure around the longitudinal axis, and the turbine wheel comprises compressor blades facing toward the forward housing and turbine blades facing toward the exhaust pipe,
wherein the intake is positioned forward of the compressor blades, and
the bypass duct and the longitudinal axis extend within a common plane.

15. The method as recited in claim 14, wherein additively manufacturing the base layer comprises additively manufacturing at least one of a forward housing, a combustor housing, and an exhaust pipe.

16. The method as recited in claim 14, further comprising additively manufacturing a lattice structure into the air gap.

17. The gas turbine engine as recited in claim 5, wherein the gas turbine engine is attritable.

\* \* \* \* \*